United States Patent [19]
Koziol
[11] 3,773,975
[45] Nov. 20, 1973

[54] FSK DIGITAL TRANSMITTER

[75] Inventor: Leo B. Koziol, Livonia, Mich.
[73] Assignee: Burroughs Corporation, Detroit, Mich.

[22] Filed: Dec. 17, 1971
[21] Appl. No.: 209,029

[52] U.S. Cl. .................... 178/66 R, 332/9, 325/30, 179/2 DP
[51] Int. Cl. .................... H04l 27/12
[58] Field of Search .................... 179/2 DP; 325/30, 325/163, 320; 178/66 R; 332/9, 9 T

[56] References Cited
UNITED STATES PATENTS

| | | | |
|---|---|---|---|
| 3,668,562 | 6/1972 | Fritkin | 178/66 R |
| 3,597,599 | 8/1971 | Melvin | 235/154 |
| 3,659,048 | 4/1972 | Zuerblis | 331/179 |

*Primary Examiner*—Kathleen H. Claffy
*Assistant Examiner*—Thomas D'Amico
*Attorney*—Paul W. Fish et al.

[57] ABSTRACT

A digital transmitter used in data sets for digitally constructing sine waves to transmit mark and space information signals over a communication channel. A medium frequency oscillator supplies the basic timing for selecting consecutive segments of a sine wave and an amplitude selector generates signals representing the amplitudes of each segment to be supplied to a digital to analogue converter. Through several steps of frequency division, the phase angle error at the frequency shifts, due to mark and space transistion, is reduced to an extremely small angle. The apparatus shown is applicable to the several frequency ranges of data sets.

8 Claims, 22 Drawing Figures

INVENTOR
LEO B. KOZIOL
BY Russel C. Wells
ATTORNEY

FSK DIGITAL TRANSMITTER

BACKGROUND OF THE INVENTION

1. Field of the Invention

This invention relates in general to FSK data sets and more particularly to digital transmitters for use in constructing the sine wave transmission signals.

2. Description of Prior Art

In general data sets are fabricated using analogue techniques. One technique of obtaining frequency shift keying signals is by the filtering of square waves that are produced by voltage controlled oscillators and supplying the filtered signals to a communication channel. The disadvantage of such a technique is the requirement of bulky components that require frequent adjustments due to component drifting.

Another analogue technique which is found in data sets of all speeds, is that of the multiple bit transmission signal. In this technique either two or more bits of information are grouped together and transmitted as one bit. This is accomplished by shifting the phase of each bit according to its binary content. In the technique which uses two bits or a dibit technique, four phases are used to satisfy the four configurations of binary zero and one. When three bits or a tribit technique is used eight phases are required to differentiate between each transmitted bit. In addition two phase transmission may be used when transmission is serial bit by bit.

It is to the frequency shift keying field of art to which this disclosure is primarily directed although its principals and teachings may be applied to any technique wherein a frequency modulated waveshape is transmitted.

SUMMARY OF THE INVENTION

It is a principal object of this invention to digitally construct sine waves for data communication wherein the phase angle error between adjacent frequencies is a minimum.

It is a further object of this invention to provide a digital transmitter for a data set using a medium frequency pulse generating source thereby avoiding component shielding from frequency radiation.

In accordance with these and other objects which will hereinafter become apparent, there is disclosed and defined a digital transmitter for use in data sets having an input terminal for receiving binary encoded information from the business machine wherein one value is a mark signal and the other value is a space signal. A pulse generating means of medium frequency is used for generating a pulse train to be logically combined with the received binary encoded information in a frequency selection means for generating an electrical pulse signal in accordance with the binary encoded value. The frequency selection means functions to divide the frequency of the pulse generating means according to the value of the received binary encoded information. The output of the frequency selection means is gated to a sinusoidal segment selection means for selecting consecutive segments of a sinusoidal electrical signal to be used for digitally constructing a sinusoid. The output of the sinusoidal selection means is logically connected to the segment amplitude selection means for generating at least one digital binary signal representing the signal amplitude of said selected segment. A digital to analogue converter is responsive to the output of the segment amplitude selection means for digitally constructing sinusoidal frequency modulated electrical signals for transmission along a communication channel.

DETAILED DESCRIPTION

Figure 1:
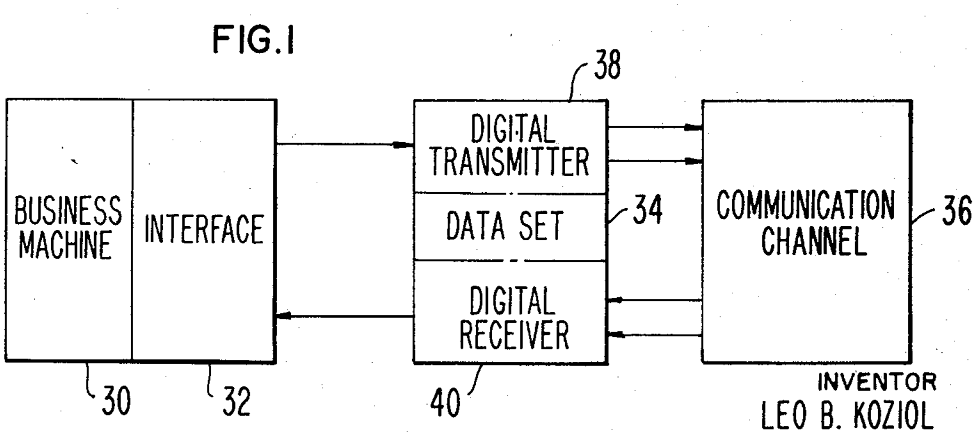
FIG. 1 is a block diagram illustrating one environment of the digital transmitter disclosed herein.

Referring to the FIGS. by the characters of reference, there is illustrated in FIG. 1 in block diagrammatic form an environment of the digital transmitter disclosed herein. The environment includes a business machine 30 coupled through an interface 32 to a data set 34 then coupled to a communication channel 36 for the transmission of electrical signals to another location such as a central computing center. At the central computing center, the data is collected from several different locations, mixed together to generate business reports.

The business machine 30 that is illustrated in FIG. 1 may be a machine such as that disclosed in U. S. Pat. No. 3,564,509 entitled Data Processing Apparatus by Perkins et al and assigned to the same assignee as the present invention. The business machine interface 32 functions to prepare the signals emanating from the business machine 30 for use by the data set 34. Depending upon the type of communication channel 36 used, the signals generated by the business machine 30 are adjusted or corrected as respects voltage amplitude and power.

A data set is defined as a device which performs the modulation/demodulation and control functions necessary to provide compatability between business machines and communication facilities. Typically a data set is also identified as a modem which is an acronym for modulator/demodulator. In the preferred embodiment, the data set or modem 34 is the modulator/-demodulator for generating a frequency modulated carrier by the technique of frequency shift keying (FSK) for the transmission and reception of digital data. Additionally the data set 34 is a medium speed asynchronous data set for a serial data transmission system over a communication channel 36 such as an unconditioned voice grade telephone line. Data information is transmitted from and received by the data set at rates up to 1,800 bits per second (bps) by a sinusoidal electrical signal being modulated between two frequencies. The first frequency represents the transmission of a mark signal and is 1300 hertz and the second frequency represents the transmission of the space signal and is 2100 hertz. However, by suitable modification, the digital transmitter 38 disclosed herein may function at either higher or lower transmission rates or transmission frequencies.

The transmitter 38 functions as a modulator for converting the digital data from the business machine 30 into a frequency modulated signal for transmission over communication channel 36. The transmitter 38 receives binary encoded information from the business machine 30 wherein the one binary value is a mark signal and a zero binary value is a space signal. The transmitter 38 converts the binary encoded information signals into a substantially sinusoidal frquency modulated electrical signals for transmission over the communication channel 36. Signals received from the communication channel 36 are received by the digital receiver 40 which is a demodulator for converting the sinusoidal signals into the binary encoded information signals for use by the business machine 30. As illustrated in FIG. 1, the data set 34 is a full duplex data set wherein the operation of the transmitter 38 and receiver 40 are independent. Additionally, the digital transmitter 38 disclosed herein requires no timing or synchronizing system for the transmission of data by the data set and does not place any restrictions on the code used or the number of consecutive mark of space signals being transmitted.

Figures 20, 21, 22:
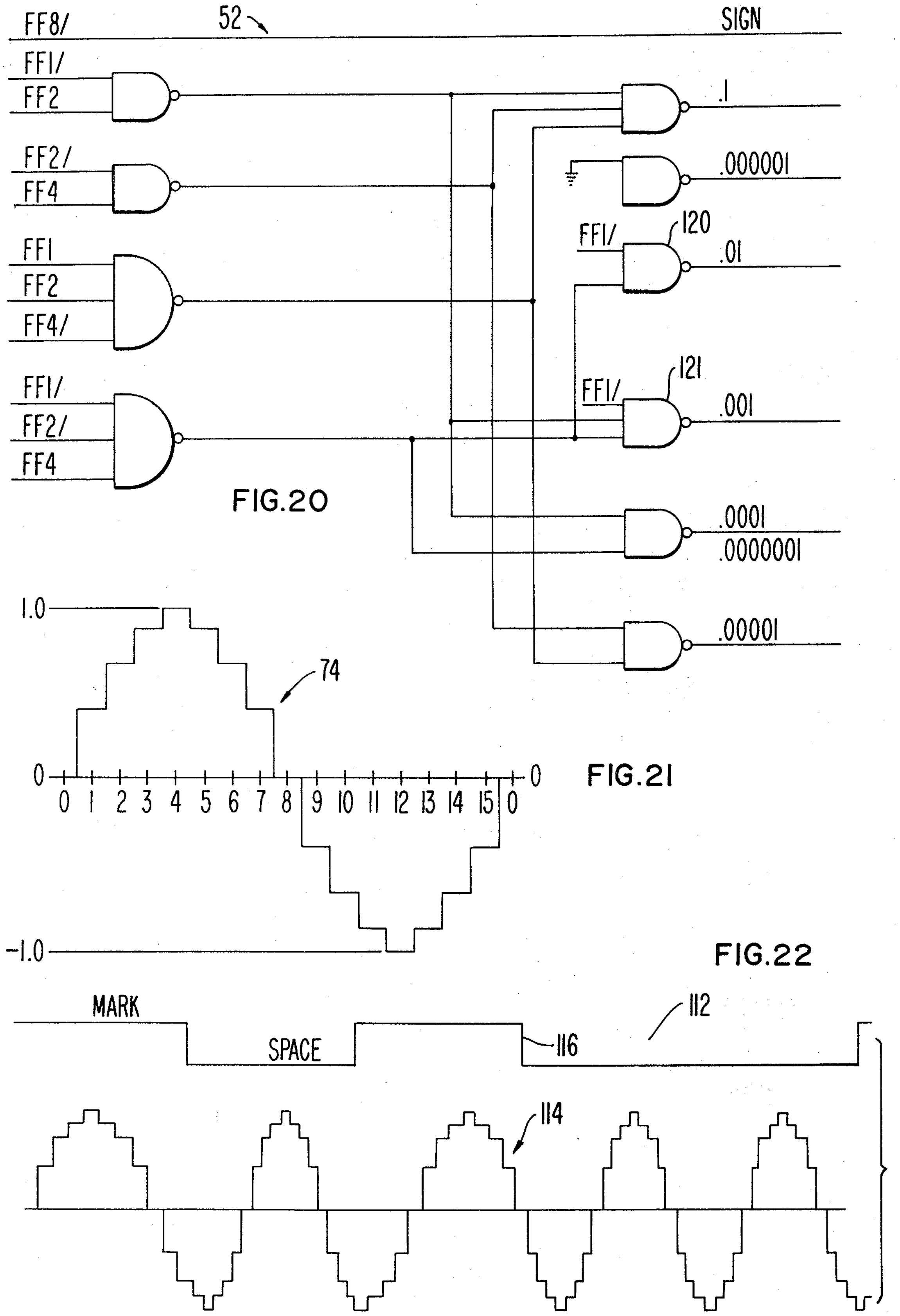
FIG. 20 is a schematic of the logic of the sinusoidal segment selection means of FIG. 2.
FIG. 21 is the output waveshape of the D/A converter of FIG. 1.
FIG. 22 is a timing diagram showing input and output of transmitter for a representative information transmission.

The term digital as used herein and in particularly when applied to the digital transmitter, defines the construction of the electrical signal to be transmitted over the communication line as being a discrete or discontinuous signal whose various states are discrete intervals apart. Such a signal is illustrated in FIG. 21. The term digital data is defined as information represented by code comprising a sequence of discrete elements.

The communication channel 36, in the preferred embodiment as hereinabove indicated, is an unconditioned voice-grade telephone line, however, other types of telephone lines may be used. In addition, other types of communication channels such as microwave channels may also be employed.

Figure 2:
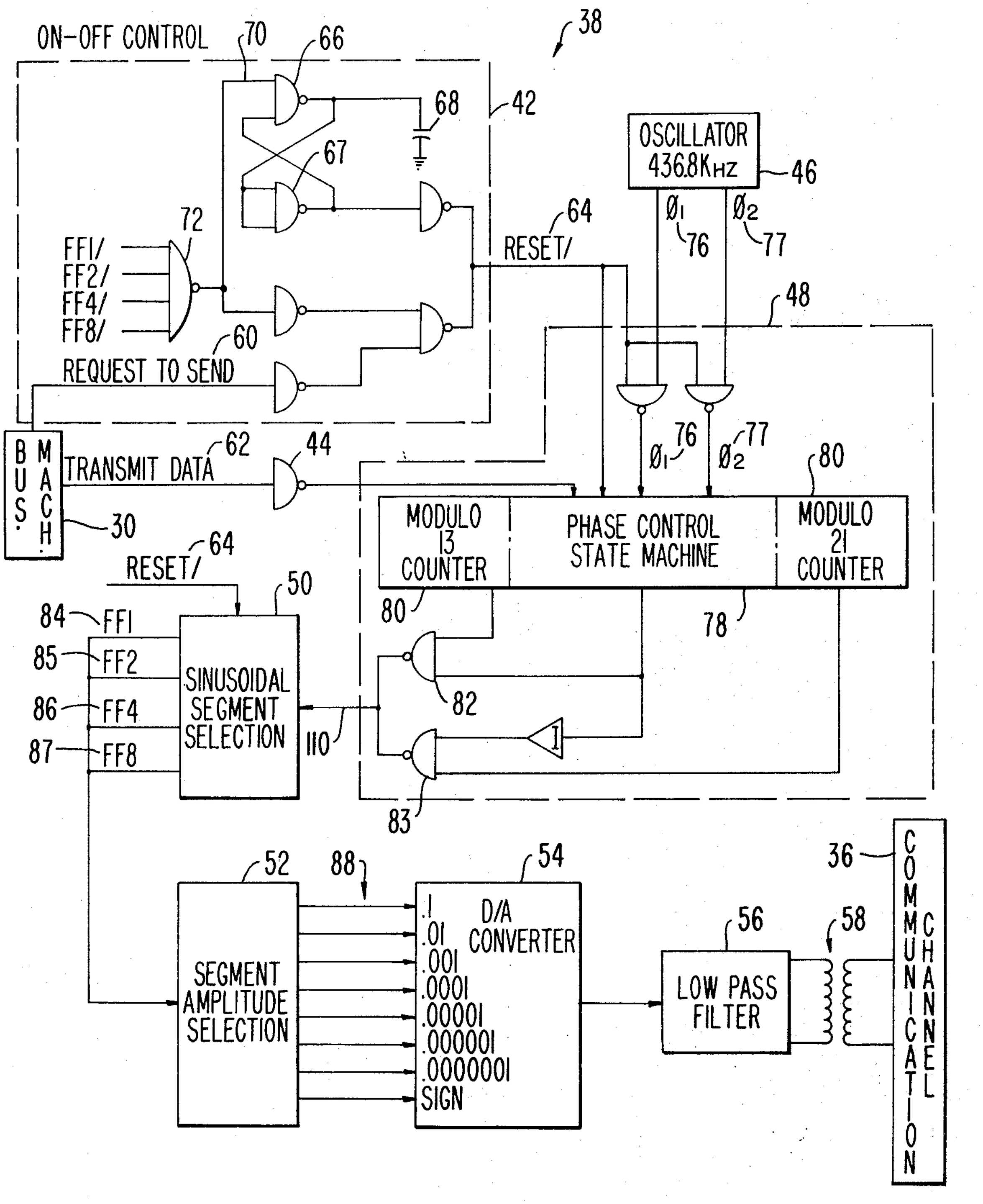
FIG. 2 is a block-schematic diagram of the digital transmitter of FIG. 1.

Referring to FIG. 2 there is illustrated in block schematic form the digital transmitter 38 of FIG. 1. The transmitter comprises an on-off control 42, a data input 44, a pulse generator means 46, a frequency selection means 48, a sinusoidal segment selection means 50, a segment amplitude selection means 52, a digital-analogue converter 54 and depending upon the type of communication channel 36 used, a low pass filter 56 for maximizing the output signal from the communication channel and an isolation transformer 58. In order to initiate the operation of the transmitter 38 two particular signals are generated by the business machine and applied to the transmitter. These two signals illustrated in FIG. 2, are labeled the "request to send" 60 and "transmit data" 62.

The request to send signal 60 is a control signal generated by the business machine 30 for conditioning the data set 34 and thereby the communication channel 36 for transmission. The communication channel 36 is enabled whenever the business machine 30 is ready for transmission and remains enabled whenever the data set 34 is transmitting. The transmit data signal 62 represents binary encoded information generated by the business machine 30 for transmission to another location over the communication channel 36. The one binary level is the mark or off condition and the zero binary level is the space condition. When the data set 34 is not transmitting, the communication channel is normally held at the mark or one binary level signal.

The on-off control 42 functions as a switch to energize the transmitter 38 for transmission. Upon receipt of the request to send signal 60, the on-off control 42 generates a signal 64 to reset or initialize the logic of the several sections of the transmitter 38. Additionally, the on-off control 42 provides means for resetting the logic when the power to the data set is initially turned on.

The power on portion of the on-off control comrpises a pair of cross-coupled NAND gates 66-67 comprising a bistable flip flop wherein the output of one 66 of the NAND gates is capacitively 68 coupled to ground. One of the inputs 70 to that NAND gate 66 receives an electrical signal indicating the status of the sinusoidal segment selection means 50 through a NAND gate 72. When the power is turned on, the capacitor 68 delays the charging or the energization of the NAND gate 66 allowing the second NAND gate 67 to reach the threshold level faster. When the output of this NAND gate 67 is true, the reset signal 64 is at the proper voltage level to reset the several logic elements of the digital transmitter. When the logic elements of the sinusoidal segment selection means 50 are reset, the first NAND gate 66 of the flip flop is switched placing a negative voltage on the upper plate of the capacitor 68 causing the output of the second NAND gate 67 of the flip flop to become negative. This shifts the reset line 64 to a voltage level which will not operate on the several logic elements of the transmitter.

The data set 34 is conditioned to transmit the receipt of the request to send signal 60 from the business machine 30. This signal is applied so as to generate a reset signal 64 to reset the several elements of the transmitter at a predetermined position. As will hereinafter be shown, it is important the sinusoidal segment selection means 50 begin at a phase angle equal to zero or 180° for each transmission.

As previously defined a digital signal 74 such as illustrated in FIG. 21 is a discrete or discontinuous signal comprising various states which are discrete intervals apart, therefore, the heart of the digital transmitter is a pulse generating means 46 such as an oscillator for generating the discrete intervals. As illustrated in FIG. 2, this is a medium frequency oscillator 46 having the frequency of 436.8 Khz. The output of the oscillator 46 is a two phase clocking signal 76 and 77 wherein one phase, $\phi_1$ 76, is interposed in the space between adjacent pules of the other phase, $\phi_1$ 77. The pulse repetition frequency of each phase is identical and is equivalent to the frequency of the oscillator.

The output of the oscillator 46 is supplied to the frequency selection means 48 comprising a control means 78 and a counting means 80. The control means 78 comprising a phase control state machine is responsive to the pulses from the oscillator 46 and functions to control the switching or counting of the counting means 80. The counting means 80 is also responsive to the pulses from the oscillator 46, namely, the phase one and two pulses 76 and 77 which are controlled by the state machine and functions to divide the pulse repetition rate or frequency of the oscillator 46 according to the binary value of the information 62 received from the business machine 30.

The transmit data signal 62 from the business machine 30 is received into the transmitter 38 through data input 44 and is supplied to the frequency selection means 48. As previously indicated, the transmit data is in a form of a binary signal level wherein the one level indicates a mark pulse and the zero level indicates a space pulse. The control means 78 generates a space signal which is applied to the two NAND gates 82 and 83 controlling the output of the counting means 80 which is functionally represented by two modulo counters. The output of the two NAND gates 82 and 83 is an electrical pulse signal having an interval between consecutive pulses which is representative of the binary level of the input data.

The electrical pulse signal, from the frequency selection means 48, is applied to the sinusoidal segment selection means 50 for selecting consecutive segments of a sinusoidal electrical signal. In the preferred embodiment, the segment selection means 50 is a four stage modulo sixteen counter responsive to each electrical signal from the frequency selection means 48. The segment selection means 50 divides one cycle of a sinusoidal wave into 16 equal angular segments as shown in FIG. 21. In the preferred embodiment, the outputs of the segment selection means 50 are labeled FF1, 84, FF2 85, FF4 86 and FF8 87. As will hereinafter will be shown the signal FF8 87 indicates the negative half of the sinusoidal waveshape.

The overall relationship between the oscillator 46, the frequency selection means 48 and the sinusoidal segment selection means 50 is a mathematical relationship. In a reverse relationship to the number of segments of a sinusoid of which the digital wave is constructed is the phase error of the generated signal, namely, the more segments the less the phase error. Since thd mark signal and space signal are both transmitted at different frequencies, the transistion between the mark and space signals will cause a frequency shift in the output signal and in most cases will introduce a phase angle error. By the proper selection of the number of segments and the frequency of the oscillator 46, the digital transmitter 38 disclosed herein digitally constructs a substantially sinusoidal electrical signal 74 such as illustrated in FIG. 21 having a very minimal phase angle error at the frequency shifts due to the mark-space transistion.

The frequency of the oscillator 46 is equal to the least common product of the frequencies of transmission and the number of selected segments in each cycle of the transmitted electrical signal. In the preferred embodiment, the least common product of the frequencies of transmission is found by multiplying 13 and 2100. To this product which is 27,300, the number of segments selected is multiplied. In the preferred embodiment, is product is 436.8 K which is the frequency of the oscillator. If it was desired to have more segments then the frequency of the oscillator 46 would increase or likewise in a similar manner if the frequency of transmission were higher the oscillator frequency would also increase.

The output of the sinusoidal selection means 50 is supplied to the segment amplitude section 52 which basically a table look-up means for generating a plurality of digital-binary signals 88 according to the input or the segment selected. With the given input the output signal from the segment amplitude selection means 52 is a representation of the amplitude of that selected segment of the sine wave. FIG. 20 is an example of the logic contained within the segment amplitude selection means and illustrates the generation of the several digital binary signals. As will hereinafter be shown, depending on the output of the segment selection means 50 the segment amplitude selection means 52 will generate one or more of the digital-binary signals 88.

Each of the digital-bianry signals 88 from the amplitude selection means 52 is applied to a digital to analogue, D/A, converter 54 such as the one manufactured by Zeltex Inc. of Concord, Calif. under the following commercial number Zd 431. In the preferred embodiment, this converter 54 is bipolar so that the output signal 74 generated from the converter 54 is that shown in FIG. 21. However, this is not a requirement as a non-bipolar or unipolar converter could be used with appropriate control on the output. The output of the D/A converter 54 is a digitally constructed sine wave 74 which depending upon the communication channel may be passed through a low pass filter 56 additionally reducing the RMS error. Coupled to the low pass filter 56 is an isolation transformer 58 providing protection to the transmitter 38 from any longitudinal voltage surges on the communication channel 36. Such voltage surges can occur when the communication channel 36 is struck by lighting.

Figure 3:
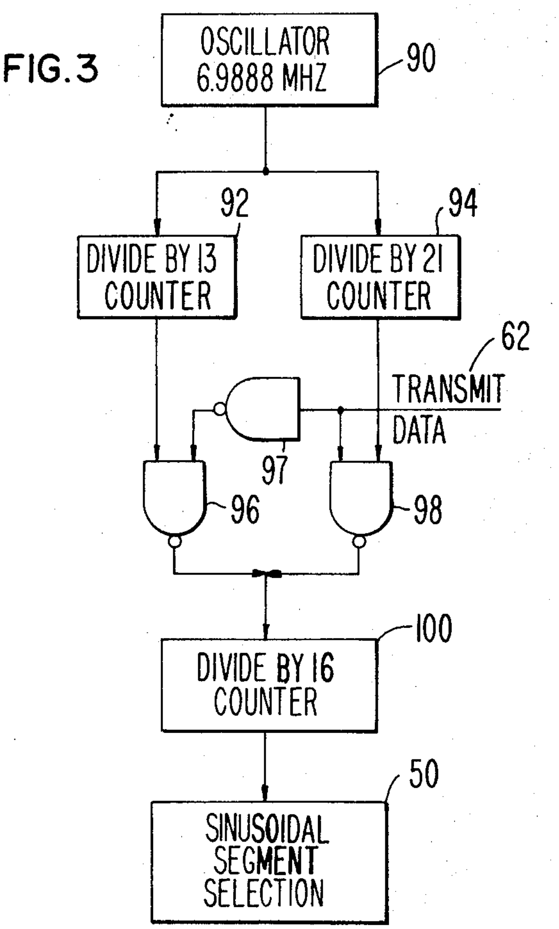
FIG. 3 is a modification of the organization of the digital transmitter of FIG. 2.

FIG. 3 illustrates a modification for providing the same desired phase angle error as the digital transmitter shown in FIG. 2. In particular, FIG. 3 requies an oscillator 90 having an extremely high frequency. In the particular embodiment illustrated, the frequency is 6.9888 Mhz which is in the range of radiation frequencies. With this high frequency the other units of the digital transmitter 38 must be shielded from effects by the radiation frequency of the oscillator. As illustrated, the output of the oscillator 90 is divided by a first or second module counter 92 and 94 and then gated 96–98 with the characteristic of the transmit data 62. This output is then divided by third counter 100 to achieve the same phase angle error at the input to the sinusoidal segment selection means 50 as in FIG. 2. In the modification of FIG. 3, the divide by sixteen counter 100 is used to reduce the phase error when the previous NAND gates 96–98 are switched. Contrary to one of the objects, as previously indicated, of the digital transmitter disclosed herein, using such a modification would require that the oscillator 90 be positioned physically external to any large LSIC circuit component. This results in added device cost.

Figure 4:
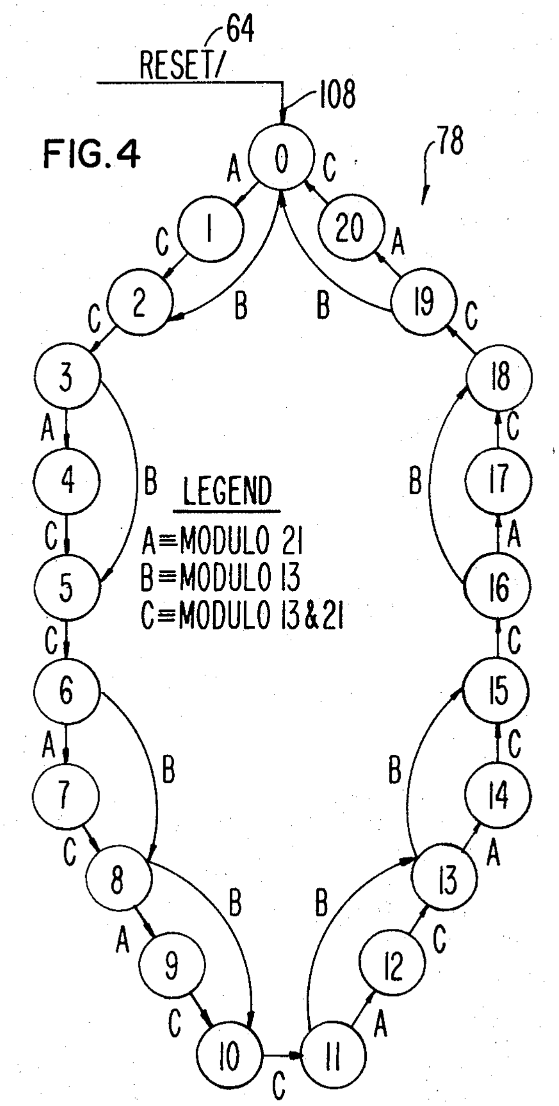
FIG. 4 is the phase control state machine diagram of the frequency selection means of FIG. 2 combining both counters therein.

The frequency selection means 48 of FIG. 2, as has previously been described, comprises a control means or a state machine 78 and a counting means 80. illustrated in FIG. 4 is a diagram for the state machine 78 of the frequency selection means 48. Illustrated in FIGS. 5 through and including 19 are the logic diagrams of the several flip flops 101–107 of the state machine 78 that together illustrte the different combining or merging of the two counters 80 into one continuous counter having counting paths according to the character of the transmit data signal and functioning as the state machine of FIG. 4. In FIG. 4 the several paths within the state machine are labeled by the letters A, B or C. The counter in the preferred embodiment is a dual modulo counter having a common input 108 and output 110 wherein each counting path begins at the common input 108 and terminates at the common output 110. The common input 108 in th preferred embodiment is achieved by the reset signal 64 being applied to the flip flops 101–107. As previously indicated, if this signal is a mark signal, the frequency of transmission is slower; namely, 1,300 hertz, therefore the oscillator must be divided by the factor of 21. Conversely, if the signal received from the business machine is a space signal, the frequency of transmission is higher; namely 2,100 hertz and the oscillator must be divided by a factor of 13. By the combining of the counters, as illustrated in FIGS. 5 through 19, the phase angle error at the frequency shift, due to mark and space transistion, is reduced to an extremely small angle.

The state machine 78 is so constructed that for each time around the state machine loop of FIG. 4, regardless of the path taken, A, B or C, when the state machine returns to state zero, a signal is generated at the output 110 that is coupled to the sinusoidal segment selection means 50 for selecting the consecutive segments of the constructed sinusoidal wave 74. In the state machine 78, there are twenty-one states, namely zero through twenty and therefore for a mark signal the state machine will go through each state consecutively. However, for a space signal which would only use a modulo thirteen counter, only thirteen states are counted within the state machine. The thirteen states were selected so that the phase angle of the modulo thirteen counter and the phase angle of the modulo twenty-one counter are either substantially identical or in close agreement. The state machine table below shows a correlation between the state number, the modulo twenty-one phase angle, the modulo thirteen phase angle and the state of the flip flops 101-107 comprising the state machine 78.

STATE MACHINE TABLE

| State number | 21 phase | 13 phase | State flip flops (101–107) A | B | C | D | E | F | G |
|---|---|---|---|---|---|---|---|---|---|
| 0 | 0 | 0 | 1 | 0 | 0 | 0 | 0 | 0 | 1 |
| 1 | 17.14 | | 1 | 0 | 0 | 0 | 0 | 1 | 0 |
| 2 | 34.29 | 27.69 | 1 | 0 | 0 | 0 | 1 | 0 | 0 |
| 3 | 51.43 | 55.39 | 1 | 0 | 0 | 1 | 0 | 0 | 0 |
| 4 | 68.57 | | 1 | 0 | 1 | 0 | 0 | 0 | 0 |
| 5 | 85.71 | 83.08 | 1 | 1 | 0 | 0 | 0 | 0 | 0 |
| 6 | 102.86 | 110.77 | 0 | 1 | 1 | 0 | 0 | 0 | 0 |
| 7 | 120.00 | | 0 | 1 | 0 | 1 | 0 | 0 | 0 |
| 8 | 137.14 | 138.46 | 0 | 1 | 0 | 0 | 1 | 0 | 0 |
| 9 | 154.29 | | 0 | 1 | 0 | 0 | 0 | 1 | 0 |
| 10 | 171.43 | 166.15 | 0 | 1 | 0 | 0 | 0 | 0 | 1 |
| 11 | 188.57 | 193.85 | 0 | 0 | 1 | 0 | 0 | 0 | 1 |
| 12 | 205.71 | | 0 | 0 | 1 | 0 | 0 | 1 | 0 |
| 13 | 222.86 | 221.54 | 0 | 0 | 1 | 0 | 1 | 0 | 0 |
| 14 | 240.00 | | 0 | 0 | 1 | 1 | 0 | 0 | 0 |
| 15 | 257.14 | 249.23 | 0 | 0 | 0 | 1 | 1 | 0 | 0 |
| 16 | 274.29 | 276.92 | 0 | 0 | 0 | 1 | 0 | 1 | 0 |
| 17 | 291.43 | | 0 | 0 | 0 | 0 | 1 | 1 | 0 |
| 18 | 308.57 | 304.62 | 0 | 0 | 0 | 0 | 0 | 1 | 1 |
| 19 | 325.71 | 332.31 | 0 | 0 | 0 | 0 | 1 | 0 | 1 |
| 20 | 342.86 | | 0 | 0 | 0 | 1 | 0 | 0 | 1 |

By referring to the above table and the state machine of FIG. 4. it is seen that for a mark signal from an initialized position, the state machine will travel along the paths labeled A and C. As stated in the legend, path A is a path taken by the modulo 21 counter and path C is a path taken by either the modulo 21 counter or the modulo 13 counter. If the information received is a space signal, then the state machine will follow paths B and C where path B is a path followed by the modulo 13 counter. As noted from the state machine and from the above table, there are several paths between consecutive states which are followed by both counters such paths are between the states 2 and 3, 5 and 6, 10 and 11, 15 and 16, 18 and 19. All other paths labeled C are used when there is a transistion of data information from a mark to a space signal when the state machine is at any state which is not common to both counters.

As a further understanding of the function of the state machine 78 consider that the data transmission at the rate of 1,800 bps which is equivalent to a bit time of 555 microseconds. The oscillator 46 generates an output pulse every 2.3 microseconds, therefore there are approximately 242 oscillator pulses for each bit of data transmission. Therefore it is seen that the state machine will go around the loop of FIG. 4, 10.5 times for a mark signal and 18.6 times for a space signal. Referring to FIG. 22, there is illustrated a sample 112 of alternate mark and space signals followed by a continuous space signal such as received at the input 44 and the resulting constructed sinusoidal electrical signals 114 at the output of D/A converter 54. In that particular example, the third transistion 116 from a mark to a space signal would occur approximately in state 12 where the state machine 78 is in the modulo 21 counter. With the receipt by the frequency selection means 48 of the space signal, the state machine would then switch the input to the segment selection means 50 from the modulo 21 to the modulo 13 counter. However, the state machine 78 will count from state 12 to state 13 which is the next modulo 13 count position. From the above state machine table this will introduce the phase error at this point of approximately 18.5° as will be seen later. This error of 18.5° is further divided by 16 in the segment selection means 50 so that phase error in the output signal 114 is approximately 1°.

Figure 5:
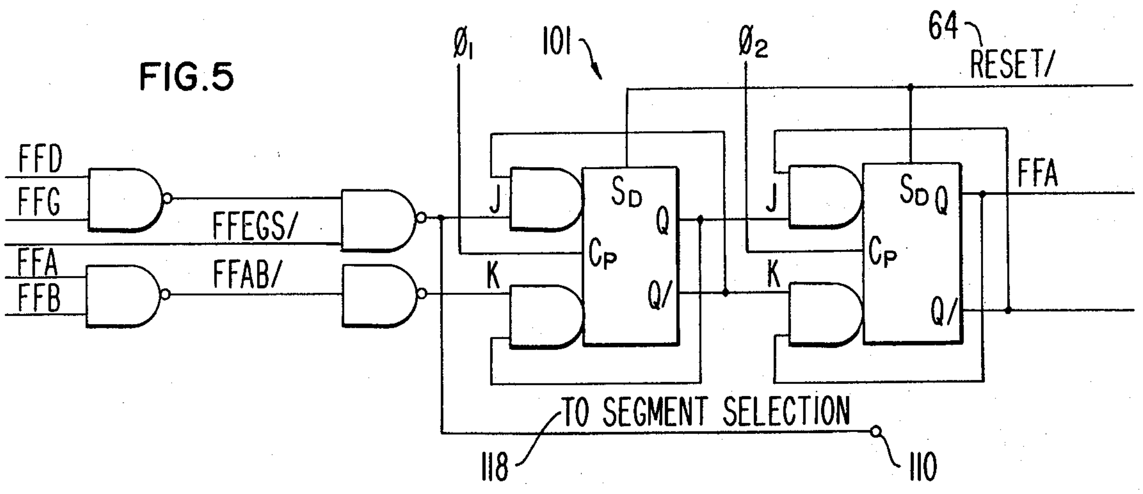
FIGS. 5–19 are schematic drawings of the logic for implementing the counter-state machine of FIG. 4.
Figure 6:
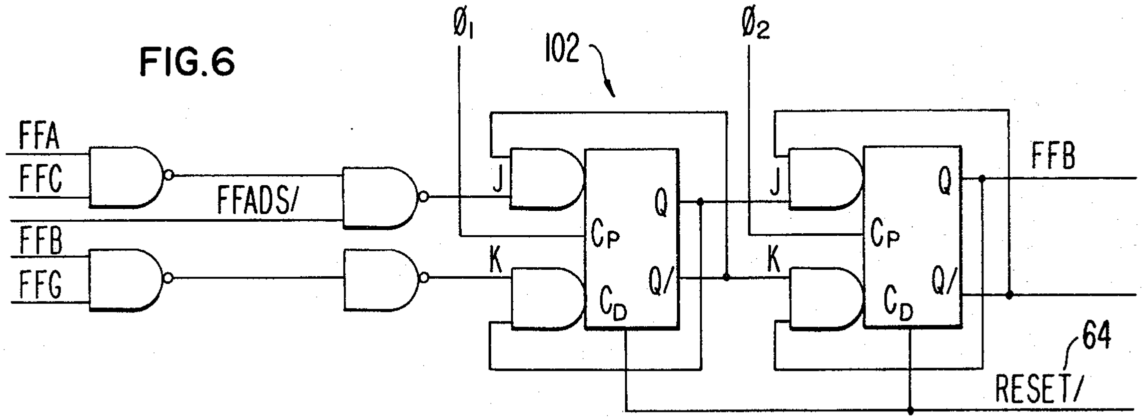
Figure 7:
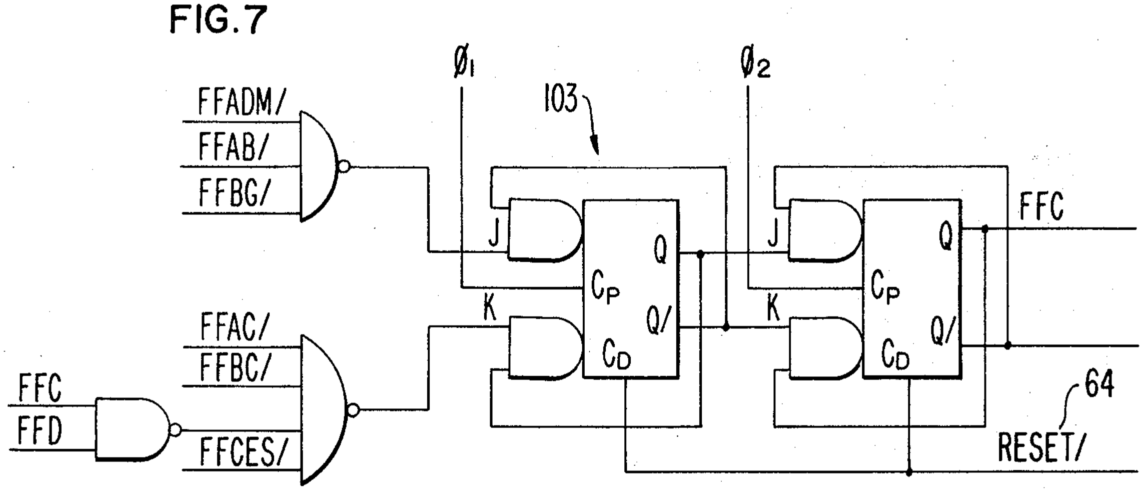
Figure 8:
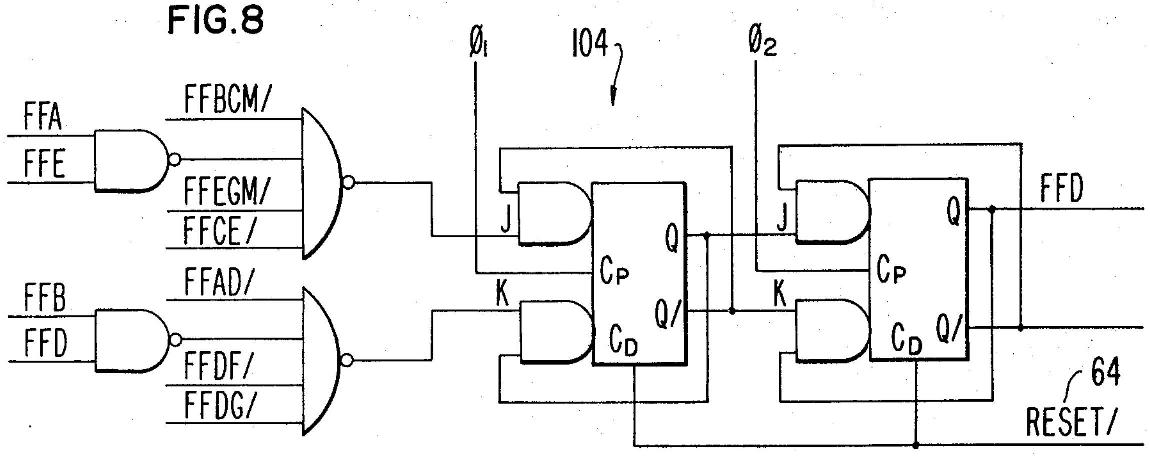
Figure 9:
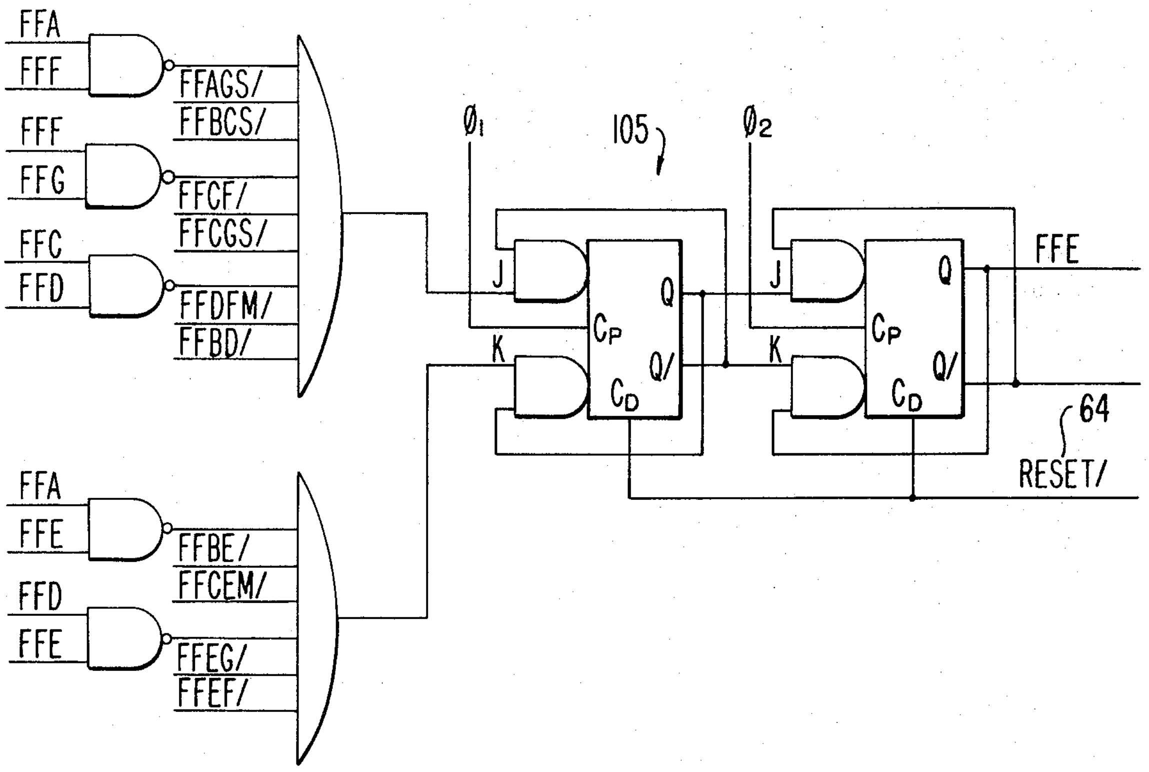
Figure 10:
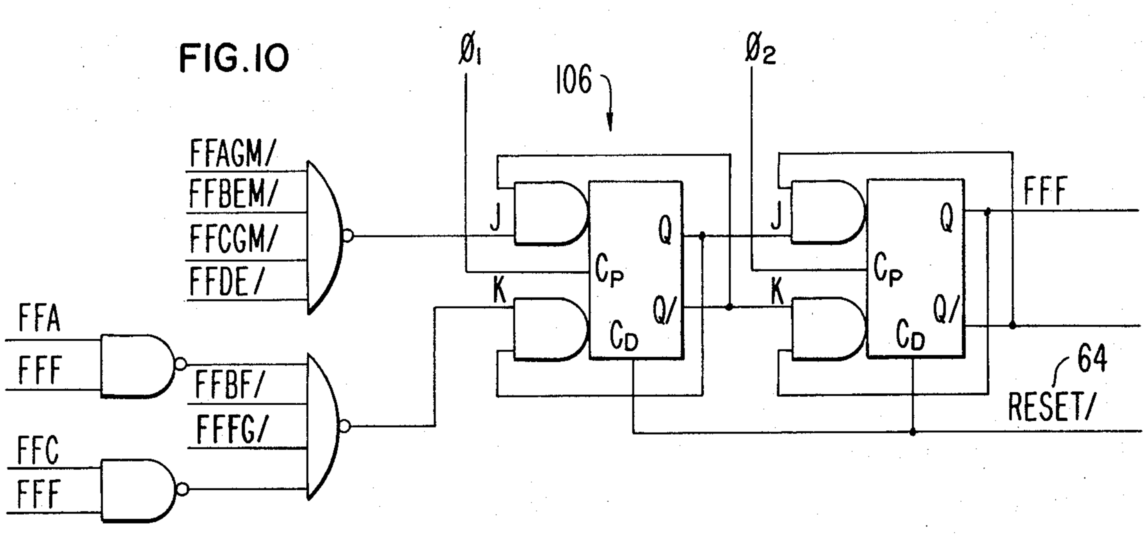
Figure 11:
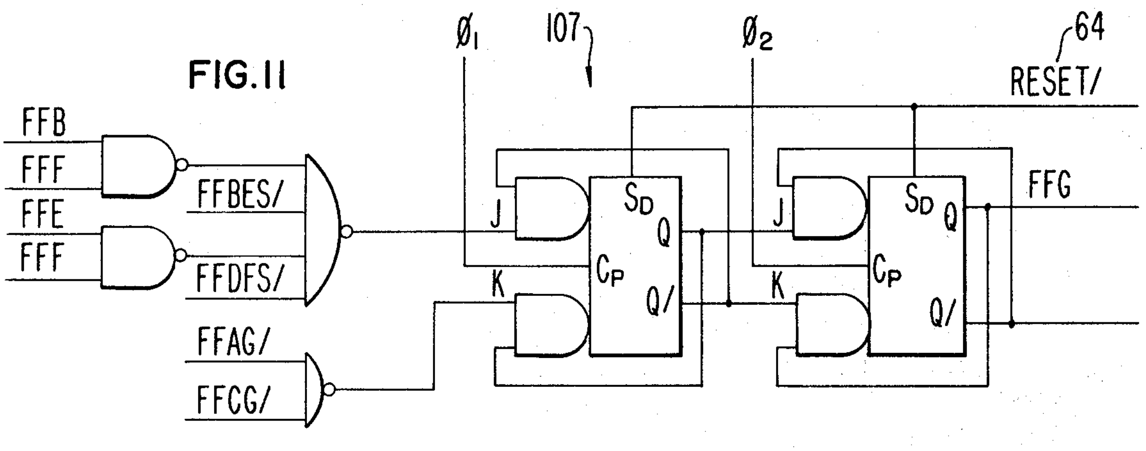
Figure 12:
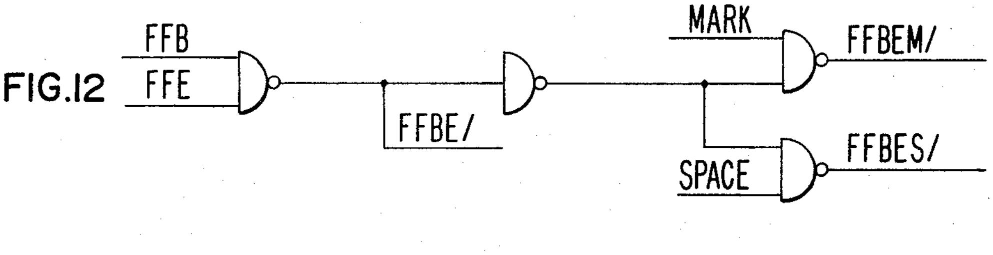
Figure 13:
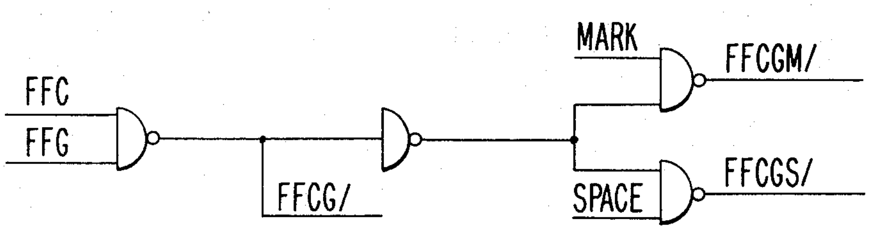
Figure 14:
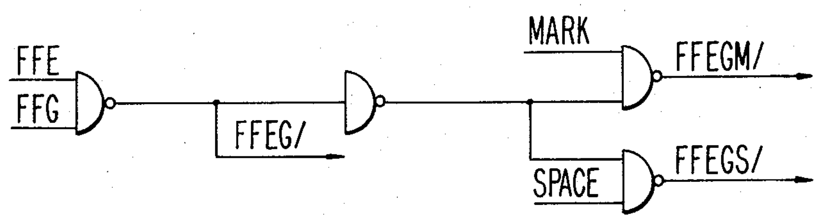
Figure 15:
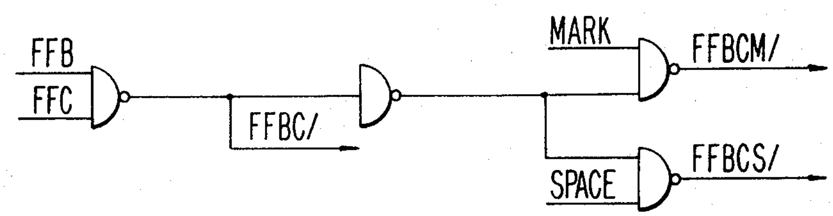
Figure 16:
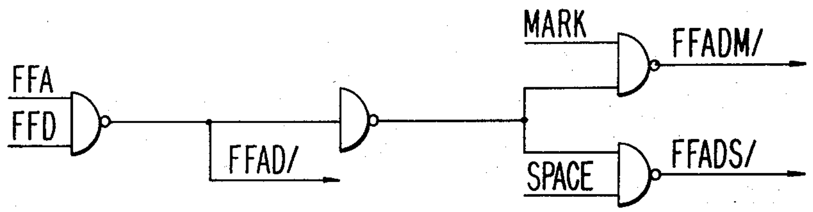
Figure 17:
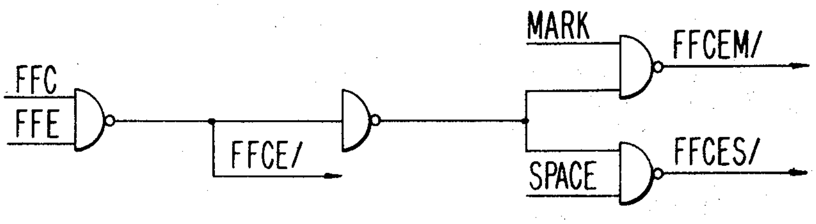
Figure 18:
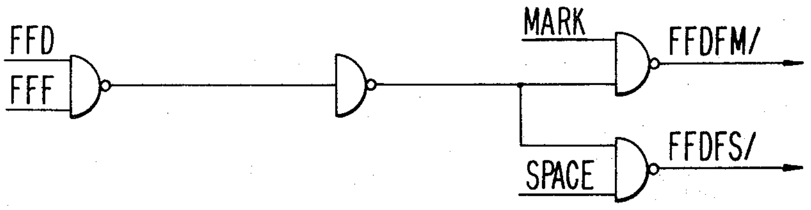
Figure 19:
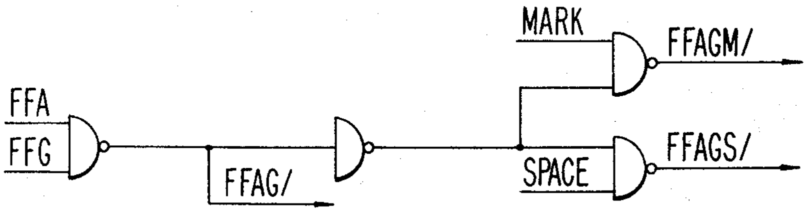

Referring to FIGS. 5 through 19, the logic illustrated is NAND logic and the flip flop pairs 101–107 are J-K flip flops. Each pair of flip flops in FIGS. 5 through and including 11 each represent one of the state flip flops of the above state table; namely A through G. In FIG. 5 there is shown the output signal 118 which sets the flip flop A 101 from either state 19 or 20 and is applied to the segment selection means 50 for selecting the segment of the sine wave to be constructed.

In the preferred embodiment, as previously indicated, the segment selection means 50 is a four stage modulo 16 counter FF1, FF2, FF4, and FF8 which is responsive to the signal 118 generated in FIG. 5 and labeled "To Segment Selection".

Referring to FIG. 20, the logic of the segment amplitude selection means 52 it is seen that when the compliment of FF8 87 is true, this indicates a sign signal and as shown in FIG. 20 as applied directly to the D/A converter 54. The other three signals 84–86 and their compliments are combined together for generating at least one of the binary-decimal inputs to the D/A converter 54. Referring to the table below, there is shown a relationship between the segment number, the nominal angle $\phi$, the average sine $\phi$ which has a tolerance of 11.25° and the corresponding digital-binary input 88 to the D/A converter 54.

SEGMENT TABLE

| Segment Number | φ nominal | Average sine φ nominal ±11.25° | Digital-binary output |
|---|---|---|---|
| 1 | 22.5 | 0.37533 | 0.0110000 |
| 2 | 45.0 | 0.69352 | 0.1011001 |
| 3 | 67.5 | 0.90613 | 0.1110100 |
| 4 | 90.0 | 0.98079 | 0.1111101 |
| 5 | 112.5 | 0.90613 | 0.1110100 |
| 6 | 135.0 | 0.69352 | 0.1011001 |
| 7 | 157.5 | 0.37533 | 0.0110000 |
| 8 | 180.0 | 0.00000 | 0.0000000 |
| 9 | 202.5 | −0.37533 | −0.0110000 |
| 10 | 225.0 | −0.69352 | −0.1011001 |
| 11 | 247.5 | −0.90613 | −0.1110100 |
| 12 | 270.0 | −0.98079 | −0.1111101 |
| 13 | 292.5 | −0.90613 | −0.1110100 |
| 14 | 315 | −0.69352 | −0.1011001 |
| 15 | 337.5 | −0.37533 | −0.0110000 |
| 0 | 360 | 0.00000 | −0.0000000 |

As illustrated in FIG. 20, the segment amplitude selection means 52 comprises a plurality of logical NAND gates wherein the inputs are from the segment selection means and the outputs are the digital-binary values for the D/A converter 54. From the above table, it is seen that for each segment, there are a plurality of active inputs to the D/A converter. For example, in segment number one it can be shown that the only NAND gates which will have a true output are the NAND gates 120 and 121 whose output is 0.01 and 0.001. Thus, in the D/A converter the only inputs which are true are the 0.01 and the 0.001 input, all other inputs are false.

Referring to FIG. 21 there is illustrated the digitally constructed sine wave 74 which is the output of the D/A converter. Each horizontal step corresponds to a consecutive segment according to the segment table, starting with segment one through zero.

As previously indicated, the quality of the signals of transmission is a function of maintaining the minimum phase angle error when changing frequencies between mark and space signals. As noted in the state machine table, the maximum phase angle error is slightly less than 18.5° which when further divided by sixteen is a phase angle error of less than 1.15°.

The digital-binary outputs from the segment amplitude selection means 52, as illustrated or shown in the segment table above, were chosen to give the least or lowest RMS error to the output wave. It has been demonstrated in the paper "Recursive Digital Filter Accuracy Requirements" by S. A. White which appeared in Volume 2, 1970 of the National Electronics Conference Seminar Notes and Real Time Digital Filtering Inspectrum Analysis, that in constructing sine waves the value to be used is the average value for the sample or segment interval under consideration. In the above segment table, the nominal angle of each segment is illustrated in the second column and since the segments are consecutive, the sample interval extends from either side of the nominal angle. In the preferred embodiment, each segment is 22.5° therefore the sample interval runs from the angle which is 11.25° less than the nominal angle to the angle which is 11.25 greater than the nominal angle. These two angles will be represented by the terminology of φ minimum and φ maximum. The average value of the sine of this segment is found by taking the sine of φ minimum plus the sine of φ maximum and dividing the sum by two. This result is shown in the third column of the above table. The digital-binary output is the closest representation of the average sine value.

There has thus been shown and described a digital transmitter 38 for use in data sets 34 for digitally constructing a sine wave representative of the data information to be transmitted and applying that cosntructive sine wave to the communication channel 36 for transmission. The digital transmitter 38 includes means 44 for receiving binary encoded information from a business machine 30 in the form of mark and space pulses. A pulse generator 46 such as an oscillator is used to generate a pulse train for use in the construction of the sine wave. The transmit data 62 and the pulse train from the pulse generator 46 are controlled by means of a state machine 78 and a counter to divide the frequency output of the oscillator 46 according to the characteristic of the data received from the business machine 30. The output pulse from the frequency selection means 48 is applied to a segment selection means 50 for counting consecutive segments of the sine wave to be constructed. The output of the selection means 50 is connected to the segment amplitude selection means 52 for generating the amplitude for each segment of the constructive sine wave. The segment amplitude selection means 52 is essentially a table look-up supplying the digital-binary inputs to the D/A converter 54 for the construction of a sine wave. The cooperation of the several means of the digital transmitter as described above results in a minimum phase angle which is less than 1.15° which allows quality transmission over unconditioned voice grade telephone lines.

Several modifications of the above digital transmitter within the teachings herein may be made to reduce the phase error even more. One such modification would be to add a further count down between the frequency selection means 48 and the sinusoidal segment selection means 50 and also increase the frequency of the oscillator 46 by a like factor.

What is claimed is:

1. In a data set, a digital transmitter for transmitting at least two substantially sinusoidal frequency modulated electrical signals each cycle of said signals comprised of segments along a communication channel comprising:

means for receiving binary encoded information wherein one value is a mark signal and the other value is a spae signal, said pulse repetition frequency being the least common product of the frequencies of transmission and the number of segments per cycle of said sinusoidal electrical signals, frequency selection means including counting means responsive to said pulses generated by said pulse generating means for dividing said pulse repetition frequency according to the value of said received binary encoded information and control means for switching the counting means according to the received binary encoded information to provide an electrical pulse signal having a minimum phase angle error during the switching of said counting means, sinusoidal segment selection means responsive to said electrical signal from said frequency selection means for selecting consecutive segments of a sinusoidal electrical signal and for further minimizing phase angle error, segment amplitude selection means responsive to said selected segment for generating at least one digital-binary signal representing the signal amplitude of said selected segment, and a digital to analogue converter responsive to said digital signals for constructing a sinusoidal frequency modulated electrical signal for transmission along the communication channel.

2. In a data set, a digital transmitter for transmitting substantially sinusoidal frequency modulated electrical signals along a communication channel according to claim 1 wherein said counting means is a dual modulo counter having a single input and a single output being operatively connected together by a first counting path for one of said counters and the second counting path for the other of said counters.

3. In a data set, a digital transmitter for transmitting sinusoidal frequency modulated electrical signals along a communication channel according to claim 1 wherein said sinusoidal segment section means is a four stage modulo sixteen counter responsive to the output pulse from said logic control means.

4. In a data set, a digital transmitter for transmitting substantially sinusoidal frequency modulated electrical signals along a communication channel according to claim 3 wherein said frequencies of transmission are 1300 hertz and 2100 hertz and the number of segments for each cycle of the transmitted electrical signal is 16 and said oscillator has a frequency of 436,800 hertz.

5. In a data set, a digital transmitter for transmitting substantially sinusoidal frequency modulated electrical signals along a communication channel according to claim 3 wherein said digital to analogue converter is bipolar for generating an electrical signal wherein each half cycle is dependent upon the state of the fourth stage of said sinusoidal segment selection means.

6. In a data set, a digital transmitter for transmitting substantially sinusoidal frequency modulated electrical signals along a communication channel according to claim 1 wherein said counting means comprises:

a dual modulo counter having a common input and output and dual counting paths wherein one path is responsive to said mark signal and the other path is responsive to said space signal and further where each of said paths begin at the common input and terminate at said common output, and said control means is a logic unit responsive to said space and mark signals received by said receiving means to operatively select the other of said count paths immediately upon receipt of the transistion between said mark and space signals.

7. In a data set, a digital transmitter for transmitting substantially sinusoidal frequency modulated electrical signals along a communication channel according to claim 1 wherein said frequency selection means comprises:

a first modulo counter responsive to said pulse generating means for dividing the frequency of said pulse generating means by a first factor, a second modulo counter responsive to said pulse generating means for dividing the frequency of said pulse generating means by a second factor, logic means responsive to said binary encoded information for selecting one output from either of said counters, and a third modulo counter responsive to said selected output from said logic means for dividing said output by a third factor for reducing the phase angle error at the frequency shift due to mark and space transistion.

8. In a data set, a digital transmitter for transmitting substantially sinusoidal frequency modulated electrical signals along a communication channel according to claim 1 wherein said control means of said frequency selection means includes a state machine responsive to said received information for switching said counting means between predetermined count paths within said counting means according to the binary value of said received information.

* * * * *

UNITED STATES PATENT OFFICE
CERTIFICATE OF CORRECTION

Patent No. 3,773,975 Dated November 20, 1973

Inventor(s) Leo B. Kokiol

It is certified that error appears in the above-identified patent and that said Letters Patent are hereby corrected as shown below:

Col. 4, line 53, "$\phi_1 77$" should read -- $\phi_2 77$ --.

Col. 5, lines 54 and 55, "is product" should read -- this product --.

Col. 6, line 8, "bianry" should read -- binary --.
lines 52 and 53 "illustrated" should read -- Illustrated --
line 68, "th" should read -- the --.

Col. 10, line 52, "spae" should read -- space --.
line 52, after "signal," insert -- pulse generating means for generating a pulse train of a predetermined pulse repetition frequency, --.

Col. 12, line 6, "at the" should read -- at said --.

Signed and sealed this 25th day of June 1974.

(SEAL)
Attest:

EDWARD M.FLETCHER,JR.
Attesting Officer

C. MARSHALL DANN
Commissioner of Patents